Aug. 15, 1950  A. Y. DODGE  2,518,761
FRICTION BRAKE FOR VEHICLES
Filed Dec. 29, 1945  2 Sheets-Sheet 1

Inventor:
Adiel Y. Dodge,
By Dawson, Booth and Spangenberg,
Attorneys.

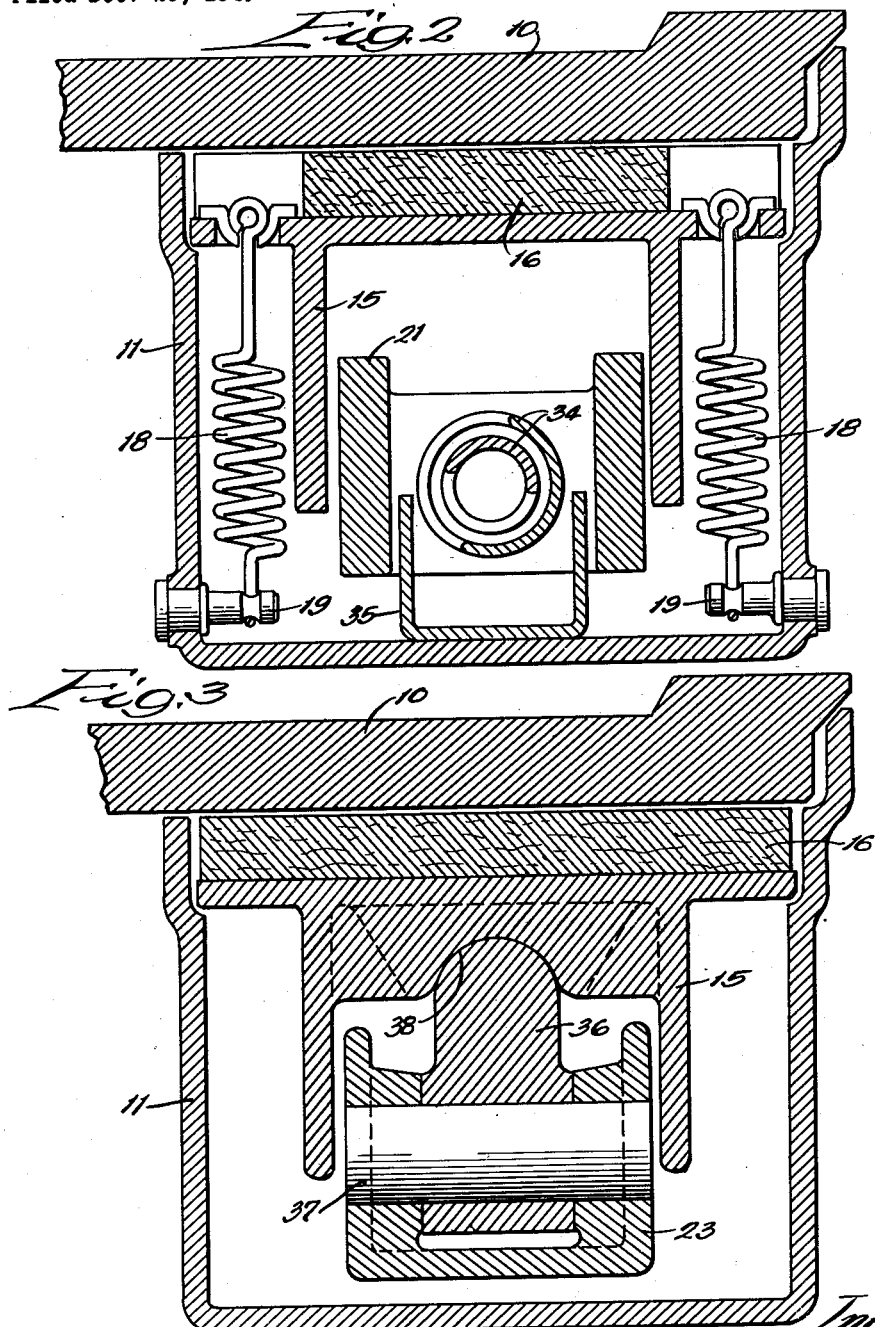

Patented Aug. 15, 1950

2,518,761

UNITED STATES PATENT OFFICE 2,518,761

FRICTION BRAKE FOR VEHICLES

Adiel Y. Dodge, Rockford, Ill.

Application December 29, 1945, Serial No. 638,166

9 Claims. (Cl. 188—78)

This invention relates to brakes and more particularly to brakes of the type adapted to be used on automotive vehicles for heavy duty service. The most commonly used brakes for heavy duty automotive service have been expanding two shoe brakes, one shoe of which has self-actuating characteristics and the other of which has deactuating characteristics. Such brakes have a number of disadvantages among which are that they cannot employ more than about 220 circumferential degrees of lining, do not wear the lining to good advantage, tend to deflect the brake drum out of round during heavy applications, and impose an unbalancing load on the wheel bearings during applications. It is one of the objects of the present invention to provide a brake of the type adapted for heavy duty automotive service in which all of these disadvantages of the conventional two shoe brake are avoided.

It is another object of the invention to provide a brake which makes possible the use of a maximum circumferential extent of brake lining, which provides highly desirable wearing characteristics, which produces uniform expansion stresses in the brake drum to minimize drum deflection, and which balances radial loads against the drum so as not to impose additional bearing loads on the wheel bearings.

Still another object is to provide a brake which is mildly self-actuating in both directions of rotation.

A further object is to provide a brake which can be adjusted simply and quickly to compensate for lining wear.

A still further object is to provide a brake which can be easily and quickly assembled and disassembled either for original assembly purposes or for repair or replacement in the field.

A still further object is to provide a brake controlled by a cam in which the followers engaging the cam lie at different angles to neutralize the frictional effects between the cam and the followers.

The above and other objects and advantages of the invention will be more readily apparent from the following description when read in connection with the accompanying drawing, in which—

Figure 2 is an enlarged partial section on the line 2—2 of Figure 1;

Figure 3 is a section on the line 3—3 of Figure 1; and

The brake of the present invention is adapted to be used with the usual cylinder brake drum 10 which may be attached to a vehicle wheel in any desired manner to provide an inner cylindrical drum surface. The brake comprises a support which is preferably channel or C shaped in section as shown at 11 and which is fixedly mounted in any desired manner within the drum 10.

Figure 1:
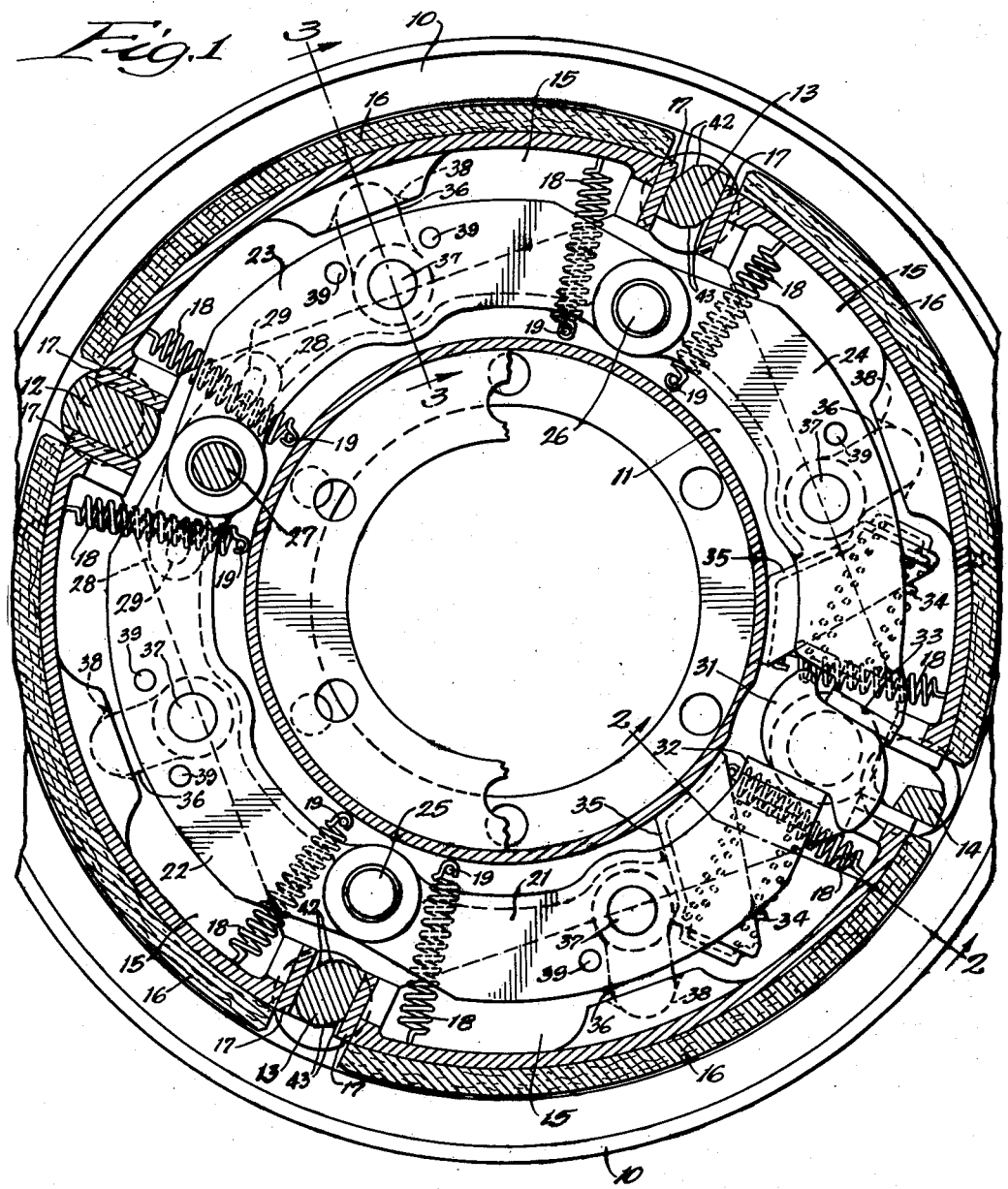
Figure 1 is an axial sectional view through a brake embodying the invention showing the brake drum in elevation.

The support 11 carries a series of abutments including a fixed abutment 12, a pair of similar adjustable abutments 13 adjacent but spaced from the abutment 12, and a fourth abutment 14 which is rotatably mounted in the support, the four abutments being provided to form part of a four shoe brake. It is also contemplated that a three shoe construction might be employed in which case one of the abutments 13 and the corresponding shoe and lever parts would be omitted. Between the several abutments, brake shoes are mounted which may be identical and which are preferably of rigid channel shaped sections as shown at 15. The brake shoe sections may be of maximum depth in their center portions tapering toward their ends as illustrated in Figure 1 and carry linings 16 on their outer surfaces to engage the inner drum surface. At their ends the brake shoes carry abutment plates 17 which are adapted to engage the abutments lying adjacent their opposite ends as shown in Figure 1. The shoes are preferably urged inward toward engagement with the abutments and away from the drum by means of individual coil springs 18 connected to pins 19 on the support 11 and to flanges on the shoes adjacent the corners of the shoes. In this way each shoe is individually urged inward and away from the drum by four separate springs connected to the shoes adjacent its four extreme corners so that the shoes tend to move uniformly away from the drum without tilting or cocking.

The shoes are actuated by means of a plurality of actuating levers lying radially within the shoes. As shown, there are four such levers, 21, 22, 23 and 24, which register respectively with the several shoes 15. The levers may conveniently be formed of channel section as best seen in Figure 3 and may be of such a size as to lie between the sides of the channel shaped brake shoes. The adjacent ends of the levers 21 and 22 are connected by a floating pivot 25 and the adjacent ends of the levers 23 and 24 are similarly connected by a floating pivot 26. The adjacent ends of levers 22 and 23 are connected by a pivot 27 carried by a mounting plate 28 which is mounted on the support by means of bolts or the like extending through slots 29 in the plate so that the plate can move circumferentially to adjust the position of the pin 27. When the pin 27 is adjusted to the proper circumferential position, the plate 28 may be secured in that position by tightening its mounting bolts so that the pin 27 then becomes a fixed pivot point.

The levers are adapted to be spread by any desired means, either pneumatic, hydraulic, magnetic or mechanical, acting on the adjacent ends of the levers 21 and 24 to separate them. As shown the levers are controlled by a rotatable cam 31 which is rotatably mounted on the support between the adjacent ends of the levers 21 and 24. The cam as shown has opposite cam surfaces which are shaped according to a substantially constantly rising spiral to provide uniform operating characteristics throughout the range of operation. One side of the cam engages a cam follower plate 32 on the end of the lever 21 and whose surface lies substantially parallel to a radius through the cam axis. The lever 24 carries a cam follower plate 33 which lies at an angle to the radius through the cam axis equal to substantially twice the angle whose tangent is equal to the coefficient of friction between the cam and follower plate. With this construction the outward forces on the ends of levers 21 and 24 upon rotation of the cam due to wiping friction of the cam over the plates 32 and 34 are substantially equalized since the frictional effect on the cam followers is neutralized. The levers are urged inward to bring the follower plates into engagement with the cam by return springs 34 lying within the channel shaped levers and engaging the ends of the levers 21 and 24 and fixed spring brackets 35 on the support.

To connect the levers with the respective shoes, pivotally mounted struts 36 are provided which are pivotally connected to the levers by pins 37. The struts 36 terminate at their outer ends in substantially ball shaped portions 38, as best seen in Figure 3, which fit slidably into complementary sockets formed in the central portions of the shoes. With this construction, when the cam is turned to spread the ends of the levers 21 and 24, the levers will expand and through the struts 36 will force the shoes outward into engagement with the drum. Assuming a counter-clockwise rotation of the drum, as seen in Figure 1, the shoes will abut against the abutment 12, 13 or 14 which is counter-clockwise with respect to each shoe so that the abutments provide fixed stops for the shoes. The abutment plates 17 at the ends of the shoes are preferably substantially parallel to a radius through the center of the adjacent abutment so that pressure of the shoe against the abutments produces a mild self-actuating effect. This effect also improves uniformity of lining wear at the abutment ends of the shoes. Since the shoes are identical at both ends, it will be seen that the braking effect is substantially the same regardless of the direction of rotation. Upon returning the cam to its release position as shown, the springs 34 will contract the lever assembly allowing the springs 18 to move the shoes inward until they engage the abutments at their opposite ends.

In initially adjusting the brake for proper application, the bolts holding the mounting plate may be loosened and the cam 31 may be turned to apply the brake. At this time the mounting plate will automatically move to its ideal adjusted position whereupon the bolts holding it may be tightened to secure it in place.

Due to the manner of mounting the brake shoes, it will be seen that the shoes can easily be removed and replaced since there is no rigid connection between them and the actuating levers. Removal of the shoes can be effected by detaching the springs 18 at which times the shoes can be lifted from the assembly for relining or replacement. If desired, pins 39 may be provided on the levers to limit swinging movement of the struts 36 when the shoes are removed so that these struts will not swing too far out of position to make it difficult to replace the shoes.

In order to adjust the brake to compensate for lining wear, the abutments 13 and 14 are preferably made adjustable. As explained these abutments are rotatably mounted on the support 11 while the abutment 12 may be fixed, since no adjustment at this point is necessary. As shown, the abutment 14 is formed with symmetrical spiral curves on its opposite sides, the curves preferably being made up of a series of connected flats to increase the bearing area between the abutment and the ends of the adjacent shoes. When the abutment 14 is turned to the position shown in Figure 1, its circumferential width is at a minimum, and maximum inward movement of the shoes is permitted. When the abutment is turned counter-clockwise, its effective width increases to move the shoes out so that increased clearance between the worn linings on the shoes and the drum will be taken up.

The abutments 13 are formed with a single spiral surface and an arcuate surface opposite thereto. As shown, the spiral surfaces are made up of a series of connected flats 42 and the arcuate surfaces are similarly made up of a series of connected flats 43 to increase the bearing area. When these abutments are turned counter-clockwise, as seen in Figure 1, they will tend to move the shoes lying between them and the fixed abutment 12 outwardly due to the effect of the spiral surfaces. Since the arcuate surfaces of these abutments engage the ends of the shoes between them and the abutment 14, these latter shoes will not be affected by turning of the abutments 13. It will be noted that in all cases the adjustment of the shoes produced by turning of the adjustable abutments causes a movement of the shoes in the same direction as the expanding movement of the levers. This maintains the same effective relationship between the several shoes and their respective levers in all positions of adjustment.

Figure 4:
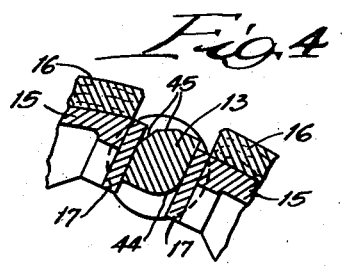
Figure 4 is a partial sectional view illustrating a modified construction of the adjusting means.

If desired, the abutments 13 may be made, as shown in Figure 4, with one arcuate curved surface 44 and an opposite spiral surface made up of a series of connected flats 45. In this connection, if the abutment is turned, the arcuately curved surface 44 will produce no movement of the adjacent shoe, but the spiral surface 45 will move the shoe adjacent thereto outwardly toward the drum.

While one embodiment of the invention has been shown and described in detail, it will be understood that this is illustrative only and is not to be taken as a definition of the scope of the invention, reference being had for this purpose to the appended claims.

What is claimed is:

1. A brake comprising a series of fixed abutments at least three in number, a series of shoes equal in number to the abutments lying in annular array between the abutments with their ends adapted to engage adjacent abutments, a plurality of pivotally interconnected levers lying radially within the shoes, the levers being equal in number to the shoes and registering respectively with the shoes, means to separate the ends of two adjacent levers to expand the series of levers radially, means providing a fixed mounting for the pivotal connection between levers which is diametrically opposite the separating means, and a strut pivotally engaging each lever and the center of its corresponding shoe.

2. A brake comprising a support, a plurality of abutments carried by the support for rotary adjustment about fixed axes, a plurality of shoes equal in number to the abutments lying in annular array between the abutments with their ends adapted to engage adjacent abutments, a plurality of pivotally connected levers lying radially within the shoes, means to separate the ends of a pair of adjacent levers to expand the levers outward, said means being in radial alignment with one of the abutments, and struts pivotally connecting the levers to the shoes to move the shoes outward as the levers expand, said one of the abutments being adjustable to move both adjacent shoes, the diametrically opposite abutment being fixed, and the intermediate abutments being adjustable to move only the shoe on the side thereof adjacent the fixed abutment.

3. A brake comprising a support, a plurality of abutments carried by the support for rotary adjustment about fixed axes, a plurality of shoes equal in number to the abutments lying in annular array between the abutments with their ends adapted to engage adjacent abutments, a plurality of pivotally connected levers lying radially within the shoes, means to separate the ends of a pair of adjacent levers to expand the levers outward, said means being in radial alignment with one of the abutments, and struts pivotally connecting the levers to the shoes to move the shoes outward as the levers expand, said one of the abutments having on both sides successively effective flat surfaces at progressively increasing distances from its center, the opposite abutment being fixed, and the intermediate abutments having spirally arranged flat surfaces only on the sides thereof adjacent the fixed abutment.

4. A brake comprising a support, four fixed abutments carried by the support, four shoes mounted in annular array between the abutments with their ends adapted to engage adjacent abutments, four pivotally connected levers lying radially within and registering with the shoes, a mounting plate carrying one of the pivots for the levers, means connecting the mounting plate to the support for circumferential adjustment thereon, means diametrically opposite the mounting plate to spread the ends of the adjacent pair of levers, and struts pivotally connected to the shoes and levers to move the shoes outward as the levers are expanded.

5. In a brake, a pair of actuating members adapted to be spread to apply the brake, a cam lying between the ends of the actuating members to spread them, the cam having opposite cam surfaces following a substantially constantly rising spiral, a cam follower plate on one of the levers parallel to a radius through the cam axis, and a follower plate on the other member lying at an acute angle to said radius equal to substantially twice the angle whose tangent equals the coefficient of friction between the cam and plate.

6. In a brake having a support and a plurality of shoes carried on the support for radial movement thereon, operating means comprising a plurality of levers at least three in number and corresponding in number to the shoes pivotally interconnected in series with the adjacent ends of two of the levers free, means carried by the central parts of the levers to connect them to the central parts of the shoes respectively, and actuating means to spread the free ends of said two of the levers to expand the levers radially.

7. In a brake having a support and four shoes carried on the support for radial movement thereon, operating means comprising four levers pivotally interconnected end to end with the adjacent ends of two of the levers free, means to connect the pivotal connection opposite the free ends to the support, means to connect the central parts of the levers to the shoes respectively, and actuating means to spread the free ends of said two of the levers radially.

8. A brake comprising an annular channel section support opening radially outward and adapted to fit in a cylindrical brake drum, a plurality of brake shoes movably mounted in annular array in the channel support for radial movement into contact with the drum, abutments for the shoes extending across the channel section of the support and carried by the sides thereof, and a plurality of pivotally interconnected operating levers pivotally mounted in the channel support radially within the shoes.

9. A brake comprising an annular channel section support opening radially outward and adapted to fit in a cylindrical brake drum, a plurality of brake shoes movably mounted in the channel support for radial movement into contact with the drum, the shoes being of channel section opening inward, and a plurality of pivotally interconnected operating levers carried in the channel support and lying partially within the channel section of the shoes.

ADIEL Y. DODGE.

REFERENCES CITED

The following references are of record in the file of this patent:

UNITED STATES PATENTS

| Number | Name | Date |
| --- | --- | --- |
| 1,663,147 | Spotz | Mar. 20, 1928 |
| 1,937,691 | Girling | Dec. 5, 1933 |
| 2,032,837 | Crockett | Mar. 3, 1936 |